(12) United States Patent
Hogan et al.

(10) Patent No.: US 9,127,109 B2
(45) Date of Patent: Sep. 8, 2015

(54) PREPARATION OF FUNCTIONAL POLYMERS PHOSPHORUS-CONTAINING ORGANOMETAL INITIATORS

(71) Applicant: Bridgestone Corporation, Chuo-Ku (JP)

(72) Inventors: Terrence E Hogan, Uniontown, OH (US); William L Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 34 days.

(21) Appl. No.: 13/874,747

(22) Filed: May 1, 2013

(65) Prior Publication Data

US 2013/0296480 A1 Nov. 7, 2013

Related U.S. Application Data

(60) Provisional application No. 61/640,915, filed on May 1, 2012.

(51) Int. Cl.

| C08F 236/14 | (2006.01) |
|---|---|
| C08F 36/04 | (2006.01) |
| C08F 4/08 | (2006.01) |
| C08F 4/48 | (2006.01) |
| C08K 3/36 | (2006.01) |
| C08K 3/04 | (2006.01) |
| C08C 19/24 | (2006.01) |
| C08C 19/44 | (2006.01) |
| C08L 15/00 | (2006.01) |

(52) U.S. Cl.
CPC ............... *C08F 236/14* (2013.01); *C08C 19/24* (2013.01); *C08C 19/44* (2013.01); *C08F 4/08* (2013.01); *C08K 3/04* (2013.01); *C08K 3/36* (2013.01); *C08L 15/00* (2013.01); *C08F 4/48* (2013.01); *C08F 36/04* (2013.01)

(58) Field of Classification Search
CPC ........... C08F 36/04; C08F 4/08; C07F 9/5013
See application file for complete search history.

(56) References Cited

U.S. PATENT DOCUMENTS

| 3,350,477 | A | | 7/1960 | Cooper | |
|---|---|---|---|---|---|
| 3,048,638 | A | * | 8/1962 | Foster | ............................. 568/8 |
| 3,312,674 | A | | 4/1967 | Welch | |
| 3,380,984 | A | * | 4/1968 | Birchall et al. | ............... 526/175 |
| 3,422,080 | A | * | 1/1969 | Hedman et al. | ............... 526/175 |
| 3,437,719 | A | | 4/1969 | Bryant et al. | |
| 3,624,057 | A | | 11/1971 | Farrar | |
| 3,700,755 | A | * | 10/1972 | Yamaguchi et al. | .......... 525/250 |
| 3,718,637 | A | * | 2/1973 | Halasa | .......................... 526/160 |
| 3,784,637 | A | | 1/1974 | Farrar | |
| 3,987,009 | A | | 10/1976 | Young | |
| 4,244,843 | A | | 1/1981 | Hashimoto et al. | |
| 4,476,240 | A | | 10/1984 | Hall et al. | |
| 4,485,833 | A | | 12/1984 | Uraneck et al. | |
| 4,537,932 | A | | 8/1985 | Uraneck et al. | |
| 4,957,976 | A | | 9/1990 | Takao et al. | |
| 5,015,692 | A | | 5/1991 | Takao et al. | |
| 5,717,042 | A | | 2/1998 | Hall | |
| 6,794,475 | B1 | | 9/2004 | Bialke et al. | |
| 2007/0167587 | A1 | * | 7/2007 | Satoh et al. | ................... 526/173 |

FOREIGN PATENT DOCUMENTS

JP     2007-091824 A     4/2007

OTHER PUBLICATIONS

Peterson (3d-Orbital Resonance in Trivalent Organophosphines. II. Additions of Organolithium Compounds to Vinylphosphines. The Journal of Organic Chemistry, 1966, 31(3), pp. 950-954).*
Morton (Alfin Catalysts and the Polymerization of Butadiene. Industrial and Engineering Chemistry. vol. 42, No. 8, pp. 1488-1496).*
International Search Report, International Appl. No. PCT/US2013/039031, dated Aug. 13, 2013 (5 pages).
Dessy, R.E. et al., Journal of the American Chemical Society, 1966, 88, 467-470 (4 pages).
Dogan, et. al., J.Org. Chem., 2000, 65, 951-957 (7 pages).
Nandi, P., et al. Oranic Letters, 2009, 11, 1689-1692 (4 pages).
Written Opinion of the International Searching Authority, International Appl. No. PCT/US2013/039031, filed May 1, 2013 (4 pages).

* cited by examiner

*Primary Examiner* — Brieann R Fink
(74) *Attorney, Agent, or Firm* — Meredith E. Hooker; Arthur M. Reginelli

(57) ABSTRACT

A method for preparing a functionalized polymer, the method comprising: polymerizing conjugated diene monomer, optionally together with comonomer, using a phosphorus-containing organometal initiator.

12 Claims, No Drawings

PREPARATION OF FUNCTIONAL POLYMERS PHOSPHORUS-CONTAINING ORGANOMETAL INITIATORS

This application claims the benefit of U.S. Provisional Application Ser. No. 61/640,915, filed on May 1, 2012, which is incorporated herein by reference.

FIELD OF THE INVENTION

One or more embodiments of the present invention are directed toward the preparation of functional polymers by employing phosphorus-containing organometal initiators.

BACKGROUND OF THE INVENTION

Anionic polymerization techniques have been used to synthesize polymers that are useful in the manufacture of tires. Using these techniques, certain organometallic compounds can be used to initiate the polymerization of monomer such as conjugated diene monomer. Due to the mechanism by which the initiation and polymerization proceeds, the organometallic compound adds to monomer to form a polymer chain wherein the organo substituent of the initiator is attached as the head group of the polymer. Common initiators include organo lithium species such as n-butyl lithium.

Certain initiators impart a functional group to the polymer. These functional groups may include a heteroatom or metal that can have a desirable impact on the polymer or compositions containing the polymer. For example, where the polymers are employed in the manufacture of tire treads, the functional group can lower the hysteresis loss of the tread vulcanizate. This lowering of hysteresis loss may result from interaction between the functional group and the filler, although other mechanisms have also been proposed.

Tributyl tin lithium compounds have been used to initiate conjugated dienes (optionally together with copolymerizable monomer) to form vulcanizable polymers (i.e., rubber) that, when used in treads, has a desirable impact on the performance of the tread. Likewise, lithiated cyclic imines (e.g., lithio hexamethyleneimine) have also been used to initiate the polymerization of similar polymers and provide rubber with desirable performance in tire treads. Still other examples include lithiated thioacetals (e.g., 2-lithio-1,3-dithianes). Still further, the use of lithium dialkylphosphines in conjunction with phosphine oxide modifiers have been proposed.

The selection of useful initiator compounds, however, is not trivial. This is especially true where there is a desire to select initiator compounds that have a desirable impact on filled rubber compositions or vulcanizates, such as tire treads. Indeed, the prior art only includes a few types of compounds that are useful. This difficulty derives from several factors. For example, the anionic polymerization of conjugated dienes is sensitive, and many compounds or substituents can poison the polymerization system. And, the selection of substituents or functional groups that can impact filled compositions, such as tire treads, is difficult to predict.

Because functional initiators remain desirable, particularly for the synthesis for functionalized polymers that are used in the manufacture of tires, there is a continued desire to identify initiators that can lead to technologically useful polymers and that have desirable impact on filled rubber compositions and/or vulcanizates.

SUMMARY OF THE INVENTION

One or more embodiments of the present invention provide a method for preparing a functionalized polymer, the method comprising: polymerizing conjugated diene monomer, optionally together with comonomer, using a phosphorus-containing organometal initiator.

Still other embodiments of the present invention provide a method for preparing a polymer, the method comprising: preparing an initiator by reacting a vinyl organophosphine with an organometal compound; and polymerizing conjugated diene monomer, optionally together with comonomer, by initiating the polymerization of the monomer with the initiator.

Still other embodiments of the present invention provide a functionalized polymer defined by the Formula V:

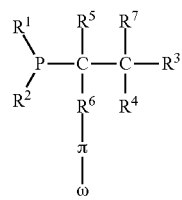

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group.

A functionalized polymer defined by the Formula VI:

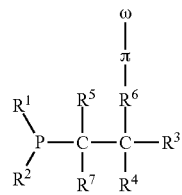

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group.

DETAILED DESCRIPTION OF ILLUSTRATIVE EMBODIMENTS

Introduction

Aspects of the present invention are based, at least in part, on the discovery of a method for initiating the anionic polymerization of diene monomer, optionally together with comonomer, using phosphorus-containing organometal compounds. While the prior art contemplates the use of lithium dialkyl phosphides, which are lithiated phosphines, the present invention employs an initiator where the phosphorus atom is directly bonded to a carbon atom. As a result, it is believed that the polymers produced by practice of the present invention have a phosphorus-containing head group that is more stable than those proposed in the prior art.

Initiator

The phosphorus-containing organometal initiator employed in practice of the present invention may be prepared by reacting a vinyl organophosphine with an organometal compound.

In one or more embodiments, the vinyl organophosphine may be defined by the formula I:

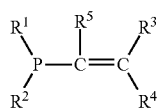

Formula I where $R^1$ and $R^2$ are each independently monovalent organic groups, or where $R^1$ and $R^2$ join to form a divalent organic group, and where $R^3$, $R^4$, and $R^5$ are each independently hydrogen or monovalent organic groups, or where $R^3$ and $R^4$ join to form a divalent organic group. In particular embodiments, $R^3$, $R^4$, and $R^5$ are hydrogen atoms.

In one or more embodiments, the monovalent organic group is a hydrocarbyl group or substituted hydrocarbyl group. Examples of hydrocarbyl groups or substituted hydrocarbyl groups include, but are not limited to, alkyl, cycloalkyl, substituted cycloalkyl, alkenyl, cycloalkenyl, aryl, substituted aryl groups, and heterocyclic groups. The hydrocarbyl group may contain heteroatoms such as, but not limited to, nitrogen, oxygen, silicon, tin, sulfur, boron, and phosphorous atoms. In one or more embodiments, the monovalent organic group may include at least 1, or the minimum number of carbon atoms required to form a group, up to about 12 carbon atoms. The term substituted is used in its conventional sense to refer to organic groups, such as alkyl groups, that replace a hydrogen atom in a parent organic group.

In one or more embodiments, types of vinyl organophosphines include vinyldihydrocarbyl phosphines, dihydrocarbyl(2,2-dihydrocarbyl-1-hydrocarbylvinyl)phosphines, dihydrocarbyl(2,2-dihydrocarbylvinyl)phosphines, dihydrocarbyl(2-hydrocarbylvinyl)phosphines, dihydrocarbyl(2-hydrocarbyl-1-hydrocarbylvinyl)phosphines, and dihydrocarbyl(1-hydrocarbylvinyl)phosphines.

Specific examples of vinyldihydrocarbyl phosphines include vinyl diphenylphosphine, vinyldicyclohexylphosphine, vinyldicyclopentylphosphine, vinyldimethylphosphine, vinyldiethylphosphine, vinyldi-n-propylphosphine, vinyldi-t-butylphosphine, vinyldi-n-octylphosphine, vinyldi-n-dodecylphosphine, vinyldipiperidylphosphine, vinyldipyrrolidylphosphine, vinyldipyridylphosphine, and vinyl dipyrrylphosphine.

Specific examples of dihydrocarbyl(2,2-dihydrocarbyl-1-hydrocarbylvinyl)phosphines include dimethyl(2,2-diphenyl-1-methylvinyl)phosphine, diethyl(2,2-diphenyl-1-methylvinyl)phosphine, di-n-propyl(2,2-diphenyl-1-methylvinyl)phosphine, di-t-butyl(2,2-diphenyl-1-methylvinyl)phosphine, di-n-octyl(2,2-diphenyl-1-methylvinyl)phosphine, di-n-dodecyl(2,2-diphenyl-1-methylvinyl)phosphine, diphenyl(2,2-diphenyl-1-methylvinyl)phosphine, dicyclohexyl(2,2-diphenyl-1-methylvinyl)phosphine, dicyclopentyl(2,2-diphenyl-1-methylvinyl)phosphine, dipiperidyl(2,2-diphenyl-1-methylvinyl)phosphine, dipyrrolidyl(2,2-diphenyl-1-methylvinyl)phosphine, dipyridyl(2,2-diphenyl-1-methylvinyl)phosphine, dipyrryl(2,2-diphenyl-1-methylvinyl)phosphine, dimethyl(2,2-diethyl-1-ethylvinyl)phosphine, diethyl(2,2-diethyl-1-ethylvinyl)phosphine, di-n-propyl(2,2-diethyl-1-ethylvinyl)phosphine, di-t-butyl(2,2-diethyl-1-ethylvinyl)phosphine, di-n-octyl(2,2-diethyl-1-ethylvinyl)phosphine, di-n-dodecyl(2,2-diethyl-1-ethylvinyl)phosphine, diphenyl(2,2-diethyl-1-ethylvinyl)phosphine, dicyclohexyl(2,2-diethyl-1-ethylvinyl)phosphine, dicyclopentyl(2,2-diethyl-1-ethylvinyl)phosphine, dipiperidyl(2,2-diethyl-1-ethylvinyl)phosphine, dipyrrolidyl(2,2-diethyl-1-ethylvinyl)phosphine, dipyridyl(2,2-diethyl-1-ethylvinyl)phosphine, dipyrryl(2,2-diethyl-1-ethylvinyl)phosphine, dimethyl(2,2-dicyclohexyl-1-propylvinyl)phosphine, diethyl(2,2-dicyclohexyl-1-propylvinyl)phosphine, di-n-propyl(2,2-dicyclohexyl-1-propylvinyl)phosphine, di-t-butyl(2,2-dicyclohexyl-1-propylvinyl)phosphine, di-n-octyl(2,2-dicyclohexyl-1-propylvinyl)phosphine, di-n-dodecyl(2,2-dicyclohexyl-1-propylvinyl)phosphine, diphenyl(2,2-dicyclohexyl-1-propylvinyl)phosphine, dicyclohexyl(2,2-dicyclohexyl-1-propylvinyl)phosphine, dicyclopentyl(2,2-dicyclohexyl-1-propylvinyl)phosphine, dipiperidyl(2,2-dicyclohexyl-1-propylvinyl)phosphine, dipyrrolidyl(2,2-dicyclohexyl-1-propylvinyl)phosphine, dipyridyl(2,2-dicyclohexyl-1-propylvinyl)phosphine, dipyrryl(2,2-dicyclohexyl-1-propylvinyl)phosphine, dimethyl(2,2-dipyridyl-1-ethylvinyl)phosphine, diethyl(2,2-dipyridyl-1-ethylvinyl)phosphine, di-n-propyl(2,2-dipyridyl-1-ethylvinyl)phosphine, di-t-butyl(2,2-dipyridyl-1-ethylvinyl)phosphine, di-n-octyl(2,2-dipyridyl-1-ethylvinyl)phosphine, di-n-dodecyl(2,2-dipyridyl-1-ethylvinyl)phosphine, diphenyl(2,2-dipyridyl-1-ethylvinyl)phosphine, dicyclohexyl(2,2-dipyridyl-1-ethylvinyl)phosphine, dicyclopentyl(2,2-dipyridyl-1-ethylvinyl)phosphine, dipiperidyl(2,2-dipyridyl-1-ethylvinyl)phosphine, dipyrrolidyl(2,2-dipyridyl-1-ethylvinyl)phosphine, dipyridyl(2,2-dipyridyl-1-ethylvinyl)phosphine, and dipyrryl(2,2-dipyridyl-1-ethylvinyl)phosphine.

Specific examples of dihydrocarbyl(2,2-dihydrocarbylvinyl)phosphines include dimethyl(2,2-diphenylvinyl)phosphine, diethyl(2,2-diphenylvinyl)phosphine, di-n-propyl(2,2-diphenylvinyl)phosphine, di-t-butyl(2,2-diphenylvinyl)phosphine, di-n-octyl(2,2-diphenylvinyl)phosphine, di-n-dodecyl(2,2-diphenylvinyl)phosphine, diphenyl(2,2-diphenylvinyl)phosphine, dicyclohexyl(2,2-diphenylvinyl)phosphine, dicyclopentyl(2,2-diphenylvinyl)phosphine, dipiperidyl(2,2-diphenylvinyl)phosphine, dipyrrolidyl(2,2-diphenylvinyl)phosphine, dipyridyl(2,2-diphenylvinyl)phosphine, dipyrryl(2,2-diphenylvinyl)phosphine, dimethyl(2,2-diethylvinyl)phosphine, diethyl(2,2-diethylvinyl)phosphine, di-n-propyl(2,2-diethylvinyl)phosphine, di-t-butyl(2,2-diethylvinyl)phosphine, di-n-octyl(2,2-diethylvinyl)phosphine, di-n-dodecyl(2,2-diethylvinyl)phosphine, diphenyl(2,2-diethylvinyl)phosphine, dicyclohexyl(2,2-diethylvinyl)phosphine, dicyclopentyl(2,2-diethylvinyl)phosphine, dipiperidyl(2,2-diethylvinyl)phosphine, dipyrrolidyl(2,2-diethylvinyl)phosphine, dipyridyl(2,2-diethylvinyl)phosphine, dipyrryl(2,2-diethylvinyl)phosphine, dimethyl(2,2-dicyclohexylvinyl)phosphine, diethyl(2,2-dicyclohexylvinyl)phosphine, di-n-propyl(2,2-dicyclohexylvinyl)phosphine, di-t-butyl(2,2-dicyclohexylvinyl)phosphine, di-n-octyl(2,2-dicyclohexylvinyl)phosphine, di-n-dodecyl(2,2-dicyclohexylvinyl)phosphine, diphenyl(2,2-dicyclohexylvinyl)phosphine, dicyclohexyl(2,2-dicyclohexylvinyl)phosphine, dicyclopentyl(2,2-dicyclohexylvinyl)phosphine, dipiperidyl(2,2-dicyclohexylvinyl)phosphine, dipyrrolidyl(2,2-dicyclohexylvinyl)phosphine, dipyridyl(2,2-dicyclohexylvinyl)phosphine, dipyrryl(2,2-dicyclohexylvinyl)phosphine, dimethyl(2,2-dipyridylvinyl)phosphine, diethyl(2,2-dipyridylvinyl)phosphine, di-n-propyl(2,2-dipyridylvinyl)phosphine, di-t-butyl(2,2-dipyridylvinyl)phosphine, di-n-octyl(2,2-dipyridylvinyl)phosphine, di-n-dodecyl(2,2-dipyridylvinyl)phosphine, diphenyl(2,2-dipyridylvinyflphosphine, dicyclohexyl(2,2-dipyridylvinyl) phosphine, dicyclopentyl(2,2-dipyridylvinyl)phosphine, dipiperidyl(2,2-dipyridylvinyl)phosphine, dipyrrolidyl(2,2-dipyridylvinyl)phosphine, dipyridyl(2,2-dipyridylvinyl)phosphine, and dipyrryl(2,2-dipyridylvinyl)phosphine.

Specific examples of dihydrocarbyl(2-hydrocarbylvinyl) phosphines include dimethyl(2-phenylvinyl)phosphine, diethyl(2-phenylvinyl)phosphine, di-n-propyl(2-phenylvinyl)phosphine, di-t-butyl(2-phenylvinyl)phosphine, di-n-octyl(2-phenylvinyl)phosphine, di-n-dodecyl(2-phenylvinyl) phosphine, diphenyl(2-phenylvinyl)phosphine, dicyclohexyl (2-phenylvinyl)phosphine, dicyclopentyl(2-phenylvinyl) phosphine, dipiperidyl(2-phenylvinyl)phosphine, dipyrrolidyl(2-phenylvinyl)phosphine, dipyridyl(2-phenylvinyl)phosphine, dipyrryl(2-phenylvinyl)phosphine, dimethyl(2-ethylvinyl)phosphine, diethyl(2-ethylvinyl) phosphine, di-n-propyl(2-ethylvinyl)phosphine, di-t-butyl (2-ethylvinyl)phosphine, di-n-octyl(2-ethylvinyl)phosphine, di-n-dodecyl(2-ethylvinyl)phosphine, diphenyl(2-ethylvinyl)phosphine, dicyclohexyl(2-ethylvinyl)phosphine, dicyclopentyl(2-ethylvinyl)phosphine, dipiperidyl(2-ethylvinyl) phosphine, dipyrrolidyl(2-ethylvinyl)phosphine, dipyridyl (2-ethylvinyl)phosphine, dipyrryl(2-ethylvinyl)phosphine, dimethyl(2-cyclohexylvinyl)phosphine, diethyl(2-cyclohexylvinyl)phosphine, di-n-propyl(2-cyclohexylvinyl)phosphine, di-t-butyl(2-cyclohexylvinyl)phosphine, di-n-octyl(2-cyclohexylvinyl)phosphine, di-n-dodecyl(2-cyclohexylvinyl)phosphine, diphenyl(2-cyclohexylvinyl) phosphine, dicyclohexyl(2-cyclohexylvinyl)phosphine, dicyclopentyl(2-cyclohexylvinyl)phosphine, dipiperidyl(2-cyclohexylvinyl)phosphine, dipyrrolidyl(2-cyclohexylvinyl) phosphine, dipyridyl(2-cyclohexylvinyl)phosphine, dipyrryl (2-cyclohexylvinyl)phosphine, dimethyl(2-pyridylvinyl) phosphine, diethyl(2-pyridylvinyl)phosphine, di-n-propyl(2-pyridylvinyl)phosphine, di-t-butyl(2-pyridylvinyl) phosphine, di-n-octyl(2-pyridylvinyl)phosphine, di-n-dodecyl(2-pyridylvinyl)phosphine, diphenyl(2-pyridylvinyl) phosphine, dicyclohexyl(2-pyridylvinyl)phosphine, dicyclopentyl(2-pyridylvinyl)phosphine, dipiperidyl(2-pyridylvinyl)phosphine, dipyrrolidyl(2-pyridylvinyl)phosphine, dipyridyl(2-pyridylvinyl)phosphine, and dipyrryl(2-pyridylvinyl)phosphine.

Specific examples of dihydrocarbyl(2-hydrocarbyl-1-hydrocarbylvinyl)phosphines include dimethyl(2-phenyl-1-methylvinyl)phosphine, diethyl(2-phenyl-1-methylvinyl) phosphine, di-n-propyl(2-phenyl-1-methylvinyl)phosphine, di-t-butyl(2-phenyl-1-methylvinyl)phosphine, di-n-octyl(2-phenyl-1-methylvinyl)phosphine, di-n-dodecyl(2-phenyl-1-methylvinyl)phosphine, diphenyl(2-phenyl-1-methylvinyl) phosphine, dicyclohexyl(2-phenyl-1-methylvinyl) phosphine, dicyclopentyl(2-phenyl-1-methylvinyl) phosphine, dipiperidyl(2-phenyl-1-methylvinyl)phosphine, dipyrrolidyl(2-phenyl-1-methylvinyl)phosphine, dipyridyl (2-phenyl-1-methylvinyl)phosphine, dipyrryl(2-phenyl-1-methylvinyl)phosphine, dimethyl(2-ethyl-1-ethylvinyl) phosphine, diethyl(2-ethyl-1-ethylvinyl)phosphine, di-n-propyl(2-ethyl-1-ethylvinyl)phosphine, di-t-butyl(2-ethyl-1-ethylvinyl)phosphine, di-n-octyl(2-ethyl-1-ethylvinyl) phosphine, di-n-dodecyl(2-ethyl-1-ethylvinyl)phosphine, diphenyl(2-ethyl-1-ethylvinyl)phosphine, dicyclohexyl(2-ethyl-1-ethylvinyl)phosphine, dicyclopentyl(2-ethyl-1-ethylvinyl)phosphine, dipiperidyl(2-ethyl-1-ethylvinyl)phosphine, dipyrrolidyl(2-ethyl-1-ethylvinyl)phosphine, dipyridyl(2-ethyl-1-ethylvinyl)phosphine, dipyrryl(2-ethyl-1-ethylvinyl)phosphine, dimethyl(2-cyclohexyl-1-propylvinyl)phosphine, diethyl(2-cyclohexyl-1-propylvinyl)phosphine, di-n-propyl(2-cyclohexyl-1-propylvinyl)phosphine, di-t-butyl(2-cyclohexyl-1-propylvinyl)phosphine, di-n-octyl (2-cyclohexyl-1-propylvinyl)phosphine, di-n-dodecyl(2-cyclohexyl-1-propylvinyl)phosphine, diphenyl(2-cyclohexyl-1-propylvinyl)phosphine, dicyclohexyl(2-cyclohexyl-1-propylvinyl)phosphine, dicyclopentyl(2-cyclohexyl-1-propylvinyl)phosphine, dipiperidyl(2-cyclohexyl-1-propylvinyl)phosphine, dipyrrolidyl(2-cyclohexyl-1-propylvinyl)phosphine, dipyridyl(2-cyclohexyl-1-propylvinyl)phosphine, dipyrryl (2,2-cyclohexyl-1-propylvinyl)phosphine, dimethyl(2-pyridyl-1-ethylvinyl) phosphine, diethyl(2-pyridyl-1-ethylvinyl)phosphine, di-n-propyl(2-pyridyl-1-ethylvinyl)phosphine, di-t-butyl(2-pyridyl-1-ethylvinyl)phosphine, di-n-octyl(2-pyridyl-1-ethylvinyl)phosphine, di-n-dodecyl(2-pyridyl-1-ethylvinyl) phosphine, diphenyl(2-pyridyl-1-ethylvinyl)phosphine, dicyclohexyl(2-pyridyl-1-ethylvinyl)phosphine, dicyclopentyl(2-pyridyl-1-ethylvinyl)phosphine, dipiperidyl(2-pyridyl-1-ethylvinyl)phosphine, dipyrrolidyl(2-pyridyl-1-ethylvinyl)phosphine, dipyridyl(2-pyridyl-1-ethylvinyl)phosphine, and dipyrryl(2-pyridyl-1-ethylvinyl)phosphine.

Specific examples of dihydrocarbyl(1-hydrocarbylvinyl) phosphines include dimethyl(1-methylvinyl)phosphine, diethyl(1-methylvinyl)phosphine, di-n-propyl(1-methylvinyl)phosphine, di-t-butyl(1-methylvinyl)phosphine, di-n-octyl(1-methylvinyl)phosphine, di-n-dodecyl(1-methylvinyl) phosphine, diphenyl(1-methylvinyl)phosphine, dicyclohexyl (1-methylvinyl)phosphine, dicyclopentyl(1-methylvinyl) phosphine, dipiperidyl(1-methylvinyl)phosphine, dipyrrolidyl(1-methylvinyl)phosphine, dipyridyl(1-methylvinyl)phosphine, dipyrryl(1-methylvinyl)phosphine, dimethyl(1-ethylvinyl)phosphine, diethyl(1-ethylvinyl)phosphine, di-n-propyl(1-ethylvinyl)phosphine, di-t-butyl(1-ethylvinyl)phosphine, di-n-octyl(1-ethylvinyl)phosphine, di-n-dodecyl(1-ethylvinyl)phosphine, diphenyl(1-ethylvinyl)phosphine, dicyclohexyl(1-ethylvinyl)phosphine, dicyclopentyl(1-ethylvinyl)phosphine, dipiperidyl(1-ethylvinyl) phosphine, dipyrrolidyl(1-ethylvinyl)phosphine, dipyridyl (1-ethylvinyl)phosphine, dipyrryl(1-ethylvinyl)phosphine, dimethyl(1-propylvinyl)phosphine, diethyl(1-propylvinyl) phosphine, di-n-propyl(1-propylvinyl)phosphine, di-t-butyl (1-propylvinyl)phosphine, di-n-octyl(1-propylvinyl)phosphine, di-n-dodecyl(1-propylvinyl)phosphine, diphenyl(1-propylvinyl)phosphine, dicyclohexyl(1-propylvinyl) phosphine, dicyclopentyl(1-propylvinyl)phosphine, dipiperidyl(1-propylvinyl)phosphine, dipyrrolidyl(1-propylvinyl)phosphine, dipyridyl(1-propylvinyl)phosphine, and dipyrryl(1-propylvinyl)phosphine.

In one or more embodiments, the organometal may be defined by the formula $M R^7_n$, where M is a metal, $R^7$ is a monovalent organic group, and n is equivalent to the valence of the metal. In one or more embodiments, the metal is a group I or group II metal. In particular embodiments, the metal is lithium.

Because organolithium compounds are generally recognized as useful in anionic polymerizations, embodiments of the present invention will be described based upon organolithium compounds or phosphorus-containing organolithium compounds with the understanding that the skilled person will be able to readily extend these teachings to other useful metals. Thus, embodiments of the invention are directed toward phosphorus-containing organolithium compounds prepared by reacting an organolithium compound with vinyl organophosphine.

Exemplary types of organolithium compounds include hydrocarbyl lithiums and substituted hydrocarbyl lithiums such as, but not limited to, alkyllithiums, cycloalkyllithiums, substituted cycloalkyllithiums, alkenyllithiums, cycloalkenyllithiums, substituted cycloalkenyllithiums, aryllithiums, allyllithiums, substituted aryllithiums, aralkyllithiums, alkaryllithiums, and alkynyllithiums, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. Specific examples of useful organolithium compounds include t-butyllithium, n-butyllithium, and isobutyllithium.

As suggested above, the phosphorus-containing organometal compound (e.g., phosphorus-containing organolithium compound) is formed by reacting an organolithium compound with a vinyl organophosphine. The amount of organolithium compound reacted with the vinyl organophosphine may be represented as a molar ratio of organolithium to vinyl organophosphine (Li/P). In one or more embodiments, the molar ratio of organolithium to vinyl organophosphine (Li/P) may be from 0.1:1 to 20:1, in other embodiments from 0.5:1 to 10:1, and in other embodiments from 0.9:1 to 1.5:1.

In one or more embodiments, the phosphorus-containing organolithium compound is pre-formed, which includes reacting the organolithium and the vinyl organophosphine compound in the presence of little to no monomer. In one or more embodiments, the reaction between the organolithium and the vinyl organophosphine takes place in the presence of less than 1 mole percent, in other embodiments less than 0.5 mole percent, and in other embodiments less than 0.1 mole percent monomer to vinyl organophosphine. In particular embodiments, the phosphorus-containing organometal compound is formed in the substantial absence of monomer, which refers to that amount of monomer or less that will not have an appreciable impact on the formation of the phosphorus-containing organometal or its use in anionic polymerization.

In one or more embodiments, the reaction between the organolithium and the vinyl organophosphine compound takes place within a solvent. In one or more embodiments, the solvent may be employed to either dissolve or suspend one or more of the organolithium, the vinyl organophosphine, or the phosphorus-containing organometal compound. Suitable solvents include those organic compounds that will not undergo polymerization or incorporation into a propagating polymer chain during polymerization of monomer in the presence of the phosphorus-containing organometal compound. In one or more embodiments, these organic solvents are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. The low-boiling hydrocarbon solvents are typically separated from the polymer upon completion of the polymerization. Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer. In yet other embodiments, examples of useful organic solvents include non-Zerwittenoff polar organic solvents. These solvents include, but are not limited to, ethers, such as dimethyl ether and diethyl ether, as well as cyclic ethers, such as tetrahydrofuran (THF) and 2,2-bis(2'-tetrahydrofuryl)propane. Other non-Zerwittenoff polar organic solvents include tertiary amines such as tri-n-butyl amine.

In one or more embodiments, the pre-formed solution concentration of the organolithium compound, the vinyl organophosphine compound, and/or the phosphorus-containing organometal compound within the solvent may be from about 5 M (molar) to about 0.005 M, in other embodiments from about 2 M to about 0.05 M, and in other embodiments from about 1.1 M to about 0.075 M.

In one or more embodiments, the reaction between the organolithium and the vinyl organophosphine compound may be conducted at a temperature from about −78° C. to about 100° C., in other embodiments from about 0° C. to about 75° C., and in other embodiments from about 10° C. to about 50° C. Also, this reaction can be conducted at atmospheric pressure. In one or more embodiments, the reaction is conducted under anaerobic conditions.

In one or more embodiments, the reaction between the organolithium and the vinyl organophosphine compound may take place in the presence of a polar coordinator. Compounds useful as polar coordinators include those compounds having an oxygen or nitrogen heteroatom and a non-bonded pair of electrons. Examples of useful polar coordinators include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as polar coordinators include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N—N'-dimethylpiperazine, diazabicyclooctane, dimethyl ether, diethyl ether, tri-n-butylamine, and mixtures thereof. When employed, the amount of polar coordinator present during the reaction between the organolithium and the vinyl organophosphine may be from about 10,000 to about 0.001, in other embodiments from about 100 to about 0.05, and in other embodiments from about 50 to about 0.1 moles per mole of the vinyl organophosphine.

Initiator Structure

While the vinyl organophosphines and the organometal are believed to react to form the phosphorus-containing organometal initiator, the exact chemical structure resulting from the reaction between all species is not known with a great deal of certainty. For example, the structure of the phosphorus-containing organometal initiators may depend on stability of the anion formed by a reaction with the organometal compound.

Without wishing to be bound by any particular theory, it is believed that in one or more embodiments, vinyldihydrocarbyl phosphines react to form phosphorus-containing organolithium compounds that can be defined by the formula II:

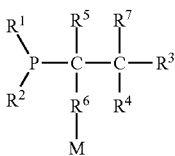

Formula II where M is a metal, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, and where $R^6$ is a bond or a divalent organic group. In particular embodiments, $R^3$, $R^4$, and $R^5$ are hydrogen atoms. In these or other particular embodiments, M is a group I (e.g. lithium) or group II (e.g. magnesium) metal. In these or other particular embodiments, $R^6$ is a divalent organic group defined by the formula III:

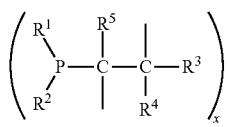

Formula II where $R^1$, $R^2$, $R^3$, $R^4$, and $R^5$ are defined as above, and x is an integer from 1 to 19. In particular embodiments, x is an integer from 1 to 10, and in other embodiments from 1 to 6. It is believed that molecules of the Formula II are obtained when, for example, butyl lithium is reacted with vinyl diphenyl phosphine.

With respect to Formula II, where $R^6$ is a substituent according to Formula III, it is believed that the alpha carbon of Formula III (i.e., the carbon next to the phosphorus atom) will be bonded to the metal atom (i.e., M) of Formula II, and the beta carbon of Formula III (i.e., the second carbon atom from the phosphorus atom) will be bonded to the alpha carbon of Formula II.

Again, without wishing to be bound by any particular theory, it is believed that certain substituted vinyl organophosphines, such as dihydrocarbyl(2-dihydrocarbylvinyl) phosphines, react to form phosphorus-containing organolithium compounds that can be defined by the formula IV:

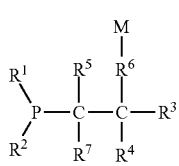

Formula IV where M is a metal, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, and where $R^6$ is a bond or a divalent organic group. In particular embodiments, $R^3$, $R^4$, and $R^5$ are hydrocarbyl groups. In these or other particular embodiments, M is a group I (e.g. lithium) or group II (e.g. magnesium) metal.

In these or other particular embodiments, $R^6$ may be a divalent organic group defined by the Formula III. With respect to Formula IV, where $R^6$ is a substituent according to Formula III, it is believed that the beta carbon of Formula III will be bonded to the metal atom of Formula IV, and the alpha carbon of Formula III will be bonded to the beta carbon of Formula IV.

In one or more embodiments, stabilized solutions of the phosphorus-containing organometal initiator of this invention can be prepared by chain extending the initiator compound. The technique of chain extending anionic polymerization initiators is known in the art as described in U.S. Publication No. 2011/0112263 and U.S. Provisional Application Ser. No. 61/576,043, which are incorporated herein by reference. In general, this technique includes polymerizing a limited amount of monomer (e.g., 3 to 25 units of butadiene) to form a stabilized chain-extended initiator. These chain-extended initiators can be represented by the formulas II and IV above, where $R^6$ includes a divalent oligomeric substituent formed by the polymerization of the limited amount of monomer (i.e., 3 to 25 mer units).

Polymerization Process

In one or more embodiments, polydiene or polydiene copolymers are prepared by introducing the pre-formed phosphorus-containing organometal compound with monomer to be polymerized. It is believed that the polymerization proceeds by anionic polymerization of the monomer with the phosphorus-containing organometal compound serving as the initiator. As will be described in more detail below, the polymer, which includes a phosphorus-containing functional group at the head of the polymer chain, may be end-functionalized to produce a polymer having a functional group at the tail-end of the polymer (i.e., a telechelic polymer is produced).

In one or more embodiments, the monomer to be polymerized includes conjugated diene monomer and optionally monomer copolymerizable therewith. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer may include vinyl-substituted aromatic compounds such as styrene, p-methylstyrene, α-methylstyrene, and vinyl naphthalene.

In one or more embodiments, the anionically-polymerized polymers are prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce reactive polymers (e.g. living polymers) that, prior to quenching, are capable of reacting with additional monomers for further chain growth or reacting with certain functionalizing agents to give functionalized polymers. As those skilled in the art appreciate, these reactive polymers include a reactive chain end, which is believed to be ionic, at which a reaction between the functionalizing agent and the polymer takes place.

Anionic polymerization may be conducted in polar solvents, non-polar solvents, and mixtures thereof. In one or more embodiments, a solvent may be employed as a carrier to either dissolve or suspend the initiator in order to facilitate the delivery of the initiator to the polymerization system. Solvents useful for conducting the polymerizations include those solvents mentioned above that are useful in preparing the initiator solutions. In particular embodiments, alkanes and/or cycloalkanes are employed.

When preparing elastomeric copolymers, such as those containing conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator. Compounds useful as randomizers include those polar coordinators mentioned above. In other embodiments, useful randomizers include potassium alkoxides.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator. In one or more embodiments, the amount of randomizer employed includes that amount introduced during formation of the initiator (i.e., the lithium organophosphide). In other embodiments, additional randomizer is added to the monomer to be polymerized.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Production of the reactive polymer can be accomplished by polymerizing conjugated diene monomer, optionally together with monomer copolymerizable with conjugated diene monomer, in the presence of an effective amount of the initiator. The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In one or more embodiments, the initiator loading (i.e., the amount of phosphorus-containing organolithium compound) may be varied from about 0.05 to about 100 mmol, in other embodiments from about 0.1 to about 50 mmol, and in still other embodiments from about 0.2 to about 5 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmospheres to about 50 atmospheres, in other embodiments from about 0.5 atmospheres to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Functionalization

In any event, this reaction produces a reactive polymer having a reactive or living end. In one or more embodiments, at least about 30% of the polymer molecules contain living ends, in other embodiments at least about 50% of the polymer molecules contain living ends, and in other embodiments at least about 80% contain living ends.

The living polymer can be protonated or subsequently functionalized or coupled. Protonation can occur by the addition of any compound that can donate a proton to the living end. Examples include water, isopropyl alcohol, and methyl alcohol.

In one or more embodiments, the living polymer can be terminated with a compound that will impart a functional group to the terminus of the polymer. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as triisobutyltin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include cyclic sulfur-containing or oxygen containing azaheterocycles such as disclosed in WO 2004/020475, U.S. Publication No. 2006/0178467 and U.S. Pat. No. 6,596,798, which are incorporated herein by reference. Other examples include boron-containing terminators such as disclosed in U.S. Pat. No. 7,598,322, which is incorporated herein by reference. Still other examples include cyclic siloxanes such as hexamethylcyclotrisiloxane, including those disclosed in co-pending U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in co-pending U.S. Ser. Nos. 60/624,347 and 60/643,653, which are incorporated herein by reference. Yet other examples include silane-type terminators, such as 3-(1,3-dimethylbutylidene)aminopropyl-triethoxysilane. Still other examples include benzaldehyde-type terminators, such as 3,4-di(tert-butyldimethylsiloxy) benzaldehyde, which are disclosed in U.S. Publication No. 2010/0286348, which is incorporated herein by reference.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1{}_nM^1X_{4-n}$, the formula (2) $M^1X_4$, and the formula (3) $M^2X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorus atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorus trichloride, phosphorus tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1{}_nM^1(OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent should be added within about 25 to 35 minutes of the peak polymerization temperature.

In one or more embodiments, the amount of the functionalizing agent employed can be described with reference to the amount of metal cation associated with the initiator. For example, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

In one or more embodiments, the functionalizing agent can be reacted with the reactive polymer after a desired monomer conversion is achieved but before the polymerization mixture is quenched by a quenching agent. In one or more embodiments, the reaction between the functionalizing agent and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below under an inert atmosphere. In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

The amount of the functionalizing agent that can be reacted with the reactive polymer may depend on various factors including the type and amount of catalyst or initiator used to initiate the polymerization and the desired degree of functionalization. In one or more embodiments, the amount of the functionalizing agent employed can be described with reference to the amount of metal cation associated with the initiator. For example, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

Quenching

In one or more embodiments, in lieu of or after the reaction between the reactive polymer and the functionalizing agent has been accomplished or completed, a quenching agent can be added to the polymerization mixture in order to inactivate any residual reactive polymer chains and/or the initiator. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

Polymer Isolation

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Polymer Product

While the use of the phosphorus-containing initiator, optionally with a coupling agent and/or functionalizing agent, are believed to react to produce novel functionalized polymers, the exact chemical structure of the functionalized polymer produced in every embodiment is not known with any great degree of certainty, particularly as the structure relates to the residue imparted to the polymer chain end by the functionalizing agent. Indeed, it is speculated that the structure of the functionalized polymer may depend upon various factors such as the conditions employed to prepare the reactive polymer (e.g., the type and amount of the initiator) and the conditions employed to react the functionalizing agent with the reactive polymer.

In one or more embodiments, practice of the present invention advantageously produces polymer having a relatively high percentage of phosphorus-containing groups located at the head of the polymer chain. Thus, while the prior art contemplates the use of lithium dialkyl phosphides as initiators, practice of the present invention advantageously yields an unexpectedly higher number of polymer chains having a phosphorus-containing head group. Moreover, this is advantageously achieved at technologically useful polymerization conditions and rates, which generally include temperatures in excess of 25° C., in other embodiments in excess of 30° C., and in other embodiments in excess of 50° C. In one or more embodiments, the polymer produced according to the present invention includes at least 30%, in other embodiments at least 50%, and in other embodiments at least 60% polymer having a phosphorus-containing head group.

In one or more embodiments, polymers produced according to embodiments of the present invention may include a functionalized polymer defined by the formula V:

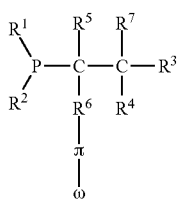

Formula V where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, π is a polymer chain, and ω is a hydrogen atom, a terminal functional group, or a multivalent coupling group. In the case where ω is a coupling group, w may have a functionality of 2 or more (e.g., 3 or 4) whereby 2 or more polymer chains (i.e., π) extend from the coupling group.

In other embodiments, polymers produced according to the present invention may include a functionalized polymer defined by the formula VI:

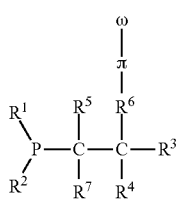

Formula VI where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, π is a polymer chain, and ω is a hydrogen atom, a terminal functional group, or a multivalent coupling group. In the case where ω is a coupling group, ω may have a functionality of 2 or more (e.g., 3 or 4) whereby 2 or more polymer chains (i.e., π) extend from the coupling group.

In one or more embodiments, the polymer chain (π) of the functionalized polymer contains unsaturation. In these or other embodiments, the polymer chain is vulcanizable. The polymer chain can have a glass transition temperature ($T_g$) that is less than 0° C., in other embodiments less than −20° C., and in other embodiments less than −30° C. In one embodiment, the polymer chain may exhibit a single glass transition temperature.

In one or more embodiments, the polymer chain (π) prepared according to this invention may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain (π) may be a copolymer of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In one or more embodiments, the polymer chain (π) is a copolymer of styrene and conjugated diene where the molar ratio of styrene mer units to conjugated diene mer units is from about 1:1 to about 0.05:1, in other embodiments from about 0.7:1 to about 0.1:1, and in other embodiments from about 0.5:1 to about 0.2:1.

In one or more embodiments, the polymer chain π is an anionically-polymerized polymer selected from the group consisting of polybutadiene, polyisoprene, poly(styrene-co-butadiene), poly(styrene-co-butadiene-co-isoprene), poly(isoprene-co-styrene), and poly(butadiene-co-isoprene). The number average molecular weight ($M_n$) of these polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

In particular embodiments, the polymers of this invention are copolymers of 1,3-butadiene, styrene, and optionally isoprene. These may include random copolymers and block copolymers. In one or more embodiments, the random polydiene copolymers may include from about 10 to about 50% by weight, in other embodiments from about 15 to about 40% by weight, and in other embodiments from about 20 to about 30% by weight units deriving from styrene, with the balance including units deriving from conjugated diene monomer, such as 1,3-butadiene, having low or medium cis content as described above.

In particular embodiments, the functional group located at the chain end (i.e., ω) can react or interact with reinforcing filler to reduce the 50° C. hysteresis loss of vulcanizates prepared there from.

Use in Tires

The functionalized polymers of this invention are particularly useful in preparing tire components. In particular embodiments, these tire components include silica filler. These tire components can be prepared by using the functionalized polymers alone or together with other rubbery polymers (i.e., polymers that can be vulcanized to form compositions possessing elastomeric properties). Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-cobutadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. For example, the vulcanizing agents may be introduced at a temperature less than 140° C., in other embodiments less than 120° C., and in other embodiments less than 110° C. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in The Compounding and Vulcanization of Rubber, in Rubber Technology ($2^{nd}$ Ed. 1973).

In order to demonstrate the practice of the present invention, the following examples have been prepared and tested. The examples should not, however, be viewed as limiting the scope of the invention. The claims will serve to define the invention.

EXAMPLES

Sample 1

Control Non-Functional Polymer

To a 7.57 L stainless steel reactor equipped with turbine agitator blades was added 1.55 kg hexanes, 0.39 kg 35.0 wt % styrene in hexanes, and 2.50 kg 21.8 wt % 1,3-butadiene in hexanes. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 87° C. Approximately 30 minutes after exotherm, a portion of the contents were discharged into isopropanol containing antioxidant (BHT). The polymer was drum dried to yield a polymer with properties listed in Table 1.

Sample 2

Synthesis of SBR Initiated with the Butyl Lithium Adduct to Vinyldiphenylphosphine To a 7.57 L stainless steel reactor equipped with turbine agitator blades was added 1.55 kg hexanes, 0.39 kg 35.0 wt % styrene in hexanes, and 2.50 kg 21.8 wt % 1,3-butadiene in hexanes. To the reactor was charged a premixed solution (which is bright yellow in color) of 3.44 mL of 1.65 M n-butyl lithium in hexanes, 4.36 mL of 1.17 M vinyldiphenylphosphine in hexanes, and 2.06 mL of 1.60 M 2,2-ditetrahydrofurylpropane (DTHFP) in hexanes and the batch was heated to an exotherm of 88.3° C. Approximately 135 minutes after exotherm, part of the contents were discharged into isopropanol containing antioxidant (BHT). The polymer was drum dried to yield a polymer with properties listed in Table 1.

Sample 3

Synthesis of SBR Initiated with the Butyl Lithium Adduct to Vinyldiphenylphosphine and Terminated with Chlorodiphenylphosphine A portion of the contents from the polymerization in Sample 2 were discharged into nitrogen purged bottles and terminated with 1 equivalent of chlorodiphenylphosphine/BuLi. The polymer was coagulated in isopropanol containing antioxidant and drum dried to yield a polymer with properties listed in Table 1.

Sample 4

Synthesis of SBR Initiated with the Butyl Lithium Adduct to 2 Equivalents of Vinyldiphenylphosphine To a 7.57 L stainless steel reactor equipped with turbine agitator blades was added 1.50 kg hexanes, 0.39 kg 35.0 wt % styrene in hexanes, and 2.56 kg 21.3 wt % 1,3-butadiene in hexanes. To the reactor was charged a premixed solution (which is bright yellow in color) of 3.44 mL of 1.65 M n-butyl lithium in hexanes, 9.69 mL of 1.17 M vinyldiphenylphosphine in hexanes, and 3.54 mL of 1.60 M 2,2-ditetrahydrofurylpropane (DTHFP) in hexanes and the batch was heated to an exotherm of 84.4° C. Approximately 30 minutes after exotherm, part of the contents were discharged into isopropanol containing antioxidant (BHT). The polymer was drum dried to yield a polymer with properties listed in Table 1.

TABLE 1

Analytical Properties of Polymers

| Sample | $M_n$ (kg/mol) | $M_w$ (kg/mol) | $T_g$, °C. | Styrene, wt % | % Vinyl (BD = 100%) | Phosphorus (ppm) | % Functionality |
|---|---|---|---|---|---|---|---|
| 1 | 117.1 | 123.4 | −36.0 | 20.6 | 54.6 | 2 | 0.7 |
| 2 | 121.3 | 133.7 | −32.9 | 22.5 | 51.7 | 196 | 76.9 |
| 3 | 117.6 | 128.4 | −32.9 | 22.5 | 51.7 | 408 | 77.4 |
| 4 | 128.5 | 200.5 | −30.2 | 21.4 | 58.0 | 348 | 69.3 |

$M_n$ and $M_w$ were measured using GPC with polystyrene standards. $T_g$ was measured using DSC. Styrene weight percent and vinyl content were determined using proton NMR. Phosphorus content was determined by using ICP (inductively coupled plasma); the reported functionality was calculated by ppm phosphorus found divided by theoretical ppm phosphorus times 100%. Theoretical phosphorus was calculated based upon phosphorus atoms in the polymer multiplied by phosphorus molecular weight divided by $M_n$ times 1,000,000.

Compounds 1A-3A. Compounding of Polymers in all Carbon Black Formulation

The formulations of the compound mixtures are presented in Table 2 in weight parts. Each rubber compound was prepared in two portions named initial (masterbatch) and final. In the initial part, the polymer from Sample 1-3 was mixed with carbon black, an antioxidant, stearic acid, wax, aromatic oil, and zinc oxide.

TABLE 2

Ingredients

| Masterbatch | |
|---|---|
| Synthetic Polymer | 100 |
| Carbon Black | 55 |
| Wax | 1 |
| Antioxidant | 0.95 |
| Zinc Oxide | 2.5 |
| Stearic Acid | 2 |
| Aromatic Oil | 10 |
| Total | 171.45 |

| Final | |
|---|---|
| Sulfur | 1.3 |
| Accelerators | 1.9 |
| Total | 174.65 |

The initial portion of the compound was mixed in a 65 g Banbury mixer operating at 60 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 60 RPM. The final material was removed from the mixer after 2.25 minutes when the material temperature was between 100-105° C. The finals were sheeted into Dynastat buttons and 15.2×15.2×0.19 cm sheets. The samples were cured at 171° C. for 15 minutes in standard molds placed in a hot press. The results of the various tests performed are reported in Table 3. Testing was conducted in a manner similar to that reported above.

TABLE 3

Physical Properties of Compounded Stocks

| Property | Compound 1A (Control) | Compound 2A | Compound 3A |
|---|---|---|---|
| $ML_{1+4}$(130° C.) | 20.2 | 25.7 | 26.7 |
| 200% Modulus @23° C. (MPa) | 8.25 | 8.35 | 8.13 |
| $T_b$ @23° C. (MPa) | 15.8 | 14.9 | 12.60 |
| $E_b$ @23° C. (%) | 335 | 314 | 276 |
| tan δ 5% γ, 50° C. | 0.224 | 0.194 | 0.180 |
| ΔG' (50° C.) (MPa) | 3.420 | 2.360 | 1.800 |
| tan δ 0.5% γ, 0° C. | 0.398 | 0.399 | 0.406 |

The Mooney viscosities ($ML_{1+4}$) of the polymer samples were determined at 100° C. by using a Monsanto Mooney viscometer with a large rotor, a one-minute warm-up time, and a four-minute running time.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test.

Temperature sweep experiments were conducted with a frequency of 10 Hz using 0.5% strain for temperature ranging from −100° C. to −10° C., and 2% strain for the temperature ranging from −10° C. to 100° C. G' is the storage modulus measured at 10 Hz and 5% strain at 50° C. Payne Effect (ΔG') was estimated from the change in G' obtained from the strain sweep analysis conducted at a frequency of 1 Hz at 50° C. with strain sweeping from 0.25% to 14.00% using a Rheometric Dynamic Analyzer (RDA).

Compounds 1B-4B. Compounding of Polymers in all Silica Formulation

The formulations of the compound mixtures are presented in Table 4 in weight parts. Each rubber compound was prepared in three portions named initial (masterbatch), remill and final. In the initial part, the polymer from Samples 1-4 was mixed with silica, an antioxidant, stearic acid, wax, oil, and zinc oxide.

TABLE 4

Ingredients

| Masterbatch | |
|---|---|
| Synthetic Polymer | 80 |
| Natural Rubber | 20 |
| Silica | 52.5 |
| Wax | 2 |
| Antioxidant | 0.95 |

TABLE 4-continued

| Ingredients | |
|---|---|
| Stearic Acid | 2 |
| Oil | 10 |
| Total | 167.45 |
| Remill | |
| Silica | 2.5 |
| Silica Coupling Agent | 5 |
| Final | |
| Sulfur | 1.5 |
| Accelerators | 4.1 |
| Zinc Oxide | 1.5 |

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 15.2×15.2×0.19 inch sheets. The samples were cured at 171° C. for 15 minutes in standard molds placed in a hot press. The results of the various tests performed are reported in Table 5. Testing was conducted in a manner similar to that reported above.

TABLE 5

Physical Properties of Compounded Stocks

| Property | Compound 1B (Control) | Compound 2B | Compound 3B | Compound 4B |
|---|---|---|---|---|
| $ML_{1+4}$ (130° C.) | 15.5 | 21.6 | 23.5 | 53.3 |
| 200% Modulus @23° C. (MPa) | 7.48 | 7.99 | 8.13 | 9.01 |
| $T_b$ @23° C. (MPa) | 12.80 | 12.10 | 12.80 | 12.90 |
| $E_b$ @23° C. (%) | 308 | 276 | 283 | 259 |
| tan δ 5% γ, 50° C. (Strain Sweep) | 0.170 | 0.139 | 0.131 | 0.113 |
| ΔG' (50° C.) (MPa) | 4.330 | 3.460 | 2.580 | 1.500 |
| tan δ 0.5% γ, 0° C. (Temperature Sweep) | 0.331 | 0.352 | 0.352 | 0.418 |

Continuous Polymerization of SBR

Sample 5

Control Non-Functional Polymer

Polymerization was conducted in a 24.6 liter reactor with a 20 minute residence time. The reactor was filled with hexane and the jacket temperature was set at 88° C. The following ingredients were metered into the bottom of the reactor: 1) 3.0 kg/hr styrene/hexane blend (31.8% styrene), 2) 24.6 kg/hr butadiene/hexane blend (21.7% butadiene), 3) 8.6 kg/hr hexane, 4) 0.39 kg/hr DTHFP/hexane (0.10 M DTHFP), 5) 7.2 cc/hr 1,2-butadiene (20%), and 6) 0.35 kg/hr lithium initiator/hexane (0.125 M lithium). An additional stream of 10.6 kg/hr butadiene/hexane blend (21.7% butadiene) was added at the midpoint of the reactor to minimize block styrene formation. Polymer cement was removed at the top of the reactor into a storage vessel. After about 1-1.5 hours of polymerization time, steady state was achieved with the top temperature of the reactor at 99° C. and the bottom temperature at 91° C. After another hour of polymerization, samples were taken at the top of the reactor, drum-dried, and had the following properties: 31 ML4, 2.0 sec t-80, and 99.7% conversion (GC).

Sample 6

SBR Initiated with VDPP

Sample 6 was the same as Sample 5 with a couple of exceptions. Ingredient 4, DTHFP/hexane, was added at 0.37 kg/hr (0.10 M DTHFP). An additional ingredient, VDPP/hexane (0.18 kg/hr, 0.2 M VDPP) was mixed with ingredients 3, 4, 5, and 6 and allowed to mix for about 14 minutes prior to entering the bottom of the reactor. Polymer properties for Sample 6 were 33 ML4, 2.3 sec t-80, and 99.7% conversion.

TABLE 6

Analytical Properties of Polymers.

| Sample | $M_n$ (kg/mol) | $M_w$ (kg/mol) | $T_g$ ° C. | Styrene, wt % | % Vinyl (BD = 100%) |
|---|---|---|---|---|---|
| 5 | 94 | 215 | −56.1 | 11.7 | 41.2 |
| 6 | 93 | 232 | −56.1 | 11.7 | 41.2 |

Compounds 5-6. Compounding of Polymers in all Silica Formulation.

The polymer samples prepared above were used to make rubber formulations (i.e., compounds) that were prepared using ingredients and a multi-stage mixing procedure as outlined in Table 4.

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 6×6×0.075 inch sheets. The samples were cured at 171° C. for 15 minutes in standard molds placed in a hot press. The results of the various tests performed are reported in Table 7. Testing was conducted in a manner similar to that reported above.

TABLE 7

Physical Properties of Compounded Stocks.

| Property | Compound 5 (Control) | Compound 6 |
|---|---|---|
| $ML_{1+4}$ (130° C.) | 30.7 | 35.3 |
| 200% Modulus @23° C. (MPa) | 7.265 | 7.342 |
| $T_b$ @23° C. (MPa) | 11.6 | 11.6 |
| $E_b$ @23° C. (%) | 291 | 287.349 |
| tan δ 5% γ, 50° C. (Strain Sweep) | 0.1482 | 0.1419 |
| ΔG' (50° C.) (MPa) | 3.341 | 3.112 |
| tan δ 0.5% γ, 0° C. (Temperature Sweep) | 0.2020 | 0.1950 |

* ΔG' = G'(0.25%γ) − G'(14.0%γ)

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising:
    polymerizing conjugated diene monomer, optionally together with comonomer, using a phosphorus-containing organometal initiator, where the phosphorus-containing organometal initiator is defined by the formula II:

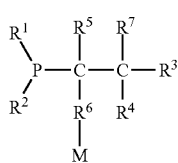

Formula II where M is lithium, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group and where $R^7$ is a monovalent organic group, or where the phosphorus-containing organolithium compound is defined by the Formula IV:

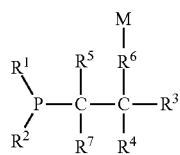

Formula IV where M is lithium, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, and where $R^6$ is a bond or a divalent organic group, and where $R^7$ is a monovalent organic group.

2. The method of claim 1, where $R^3$, $R^4$, and $R^5$ are each hydrogen atoms.

3. The method of claim 1, where at least one of $R^3$, $R^4$, and $R^5$ is a hydrocarbyl group.

4. The method of claim 1, where the amount of initiator employed is from 0.05 to about 100 mmol per 100 g of monomer.

5. The method of claim 1, where $R^6$ of Formula II or Formula IV is defined by the formula III:

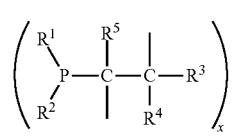

Formula III where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, $R^3$, $R^4$, and $R^5$ are hydrocarbyl groups, and where $R^1$, $R^2$, $R^3$, $R^4$, and $R^5$ are defined as above, and x is an integer from 1 to 19.

6. A method for preparing a polymer, the method comprising:
    preparing an initiator by reacting a vinyl organophosphine with an organometal compound, where the vinyl organophosphine is defined by the formula I:

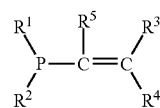

Formula I where $R^1$ and $R^2$ are each independently monovalent organic groups, or where $R^1$ and $R^2$ join to form a divalent organic group, and where $R^3$, $R^4$, and $R^5$ are each independently hydrogen or monovalent organic groups, or where $R^3$ and $R^4$ join to form a divalent organic group, and where the organometal compound is defined by the formula $MR^7_n$, where M is lithium, $R^7$ is a monovalent organic group, and n is equivalent to the valence of the lithium; and
    polymerizing conjugated diene monomer, optionally together with comonomer, by initiating the polymerization of the monomer with the initiator.

7. The method claim 6, where the vinyl organophosphines is selected from the group consisting of vinyldihydrocarbyl phosphines, dihydrocarbyl(2,2-dihydrocarbyl-1-hydrocarbylvinyl)phosphines, dihydrocarbyl(2,2-dihydrocarbylvinyl)phosphines, dihydrocarbyl(2-hydrocarbylvinyl)phosphines, dihydrocarbyl(2-hydrocarbyl-1-hydrocarbylvinyl) phosphines, and dihydrocarbyl(1-hydrocarbylvinyl) phosphines.

8. The method of claim 6, the organometal compound being an organolithium compound, where the molar ratio of organolithium to vinyl organophosphine (Li/P) is from 0.1:1 to 20:1.

9. The method of claim 6, where the monomer is 1,3-butadiene and comonomer is styrene.

10. A functionalized polymer defined by the Formula V:

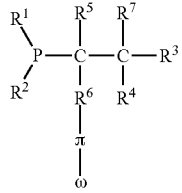

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, where $R^7$ is a monovalent organic group, P is a phosphorus atom, π is a polymer chain, and ω is a hydrogen atom, a terminal functional group, or a multivalent coupling group.

11. A functionalized polymer defined by the Formula VI:

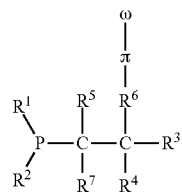

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, where $R^7$ is a monovalent organic group, P is a phosphorus atom, π is a polymer chain, and ω is a hydrogen atom, a terminal functional group, or a multivalent coupling group.

12. A vulcanizate comprising the cured product of the polymer of claims 10 and 11, wherein the vulcanizate includes carbon black, silicon, or carbon black and silica.

* * * * *